(12) United States Patent
Marui

(10) Patent No.: US 9,889,898 B1
(45) Date of Patent: Feb. 13, 2018

(54) FLOATING BICYCLE SADDLE

(71) Applicant: Shinji Marui, Kobe (JP)

(72) Inventor: Shinji Marui, Kobe (JP)

(*) Notice: Subject to any disclaimer, the term of this patent is extended or adjusted under 35 U.S.C. 154(b) by 0 days.

(21) Appl. No.: 15/297,974

(22) Filed: Oct. 19, 2016

(51) Int. Cl.
*B62J 1/08* (2006.01)
*B62J 1/10* (2006.01)

(52) U.S. Cl.
CPC .. *B62J 1/08* (2013.01); *B62J 1/10* (2013.01)

(58) Field of Classification Search
CPC ........................................ B62J 1/08; B62J 1/10
USPC ........................................................ 297/215.15
See application file for complete search history.

(56) References Cited

U.S. PATENT DOCUMENTS

| 4,568,121 A * | 2/1986 | Kashima ............... B62J 1/08 297/215.15 X |
| 6,899,389 B2 * | 5/2005 | Saccucci ............... B62J 1/08 297/215.15 |
| 2011/0241390 A1 * | 10/2011 | Tsai ............... B62J 1/08 297/215.15 X |

* cited by examiner

*Primary Examiner* — Anthony D Barfield
(74) *Attorney, Agent, or Firm* — Innovation Capital Law Group, LLP; Vic Lin

(57) ABSTRACT

A rail-less bicycle saddle apparatus includes a mounting block coupled to the bottom of a saddle shell to form a void between a top of the mounting block and the bottom of the shell. The mounting block has a pair of wings that extend laterally to attach to lateral undersides of the saddle shell. A fastener secures the mounting block to the top of a seat post.

18 Claims, 7 Drawing Sheets

FLOATING BICYCLE SADDLE

BACKGROUND OF THE INVENTION

1. Field of the Invention

The invention relates generally to bicycle saddles.

2. Description of Prior Art and Related Information

A need exists for reducing bicycle weight and simplifying the manufacturing and assembly process by reducing the number of parts. Conventional saddle rails facilitate comfort by softening the impact of the ground when riding. Removing rails from saddles reduces the number of parts, but presents complications in comfort. Saddles without rails typically provide no spacing between the bottom of the saddle and the top of the seat post connection. Therefore, shock from the seat post are felt more directly on conventional rail-less saddles.

BRIEF SUMMARY OF THE INVENTION

In accordance with the present invention, structures and associated methods are disclosed which address these needs and overcome the deficiencies of the prior art.

In one aspect, a rail-less bicycle saddle apparatus comprises a saddle shell and a mounting block with a void therebetween. The saddle shell comprises a top shell surface, a bottom shell surface, a left shell portion and a right shell portion. The mounting block may be integrally formed with the saddle shell. The mounting block comprises a top block surface, a first lateral wing coupled to the left shell portion and a second lateral wing coupled to the right shell portion. A void is defined between the bottom shell surface and the top block surface.

The apparatus may further comprise a fastener coupled to the mounting block. The apparatus may further comprise a seat post. The mounting block may be mounted on top of the seat post. The fastener couples the saddle shell and the mounting block to the seat post.

The mounting block may comprise an aperture for receiving the fastener which extends vertically downward through the aperture.

The mounting block may comprise a toothed bottom surface. The seat post may comprise a toothed upper surface configured to mate with the toothed bottom surface of the mounting block.

The saddle shell may comprise a first material while the mounting block may comprise a second material. The first material may be more flexible than the second material.

The top block surface preferably makes no contact with the bottom shell surface. The void expands substantially across a length of the saddle shell and a width of the saddle shell.

In a further aspect, a rail-less bicycle saddle apparatus comprises a saddle shell, a mounting block, and a fastener coupled to the mounting block. The saddle shell comprises a top shell surface, a bottom shell surface, a left shell portion, a right shell portion, a shell length and a shell width. The mounting block is coupled to the left shell portion and the right shell portion. The mounting block comprises a top block surface. A void is defined between the bottom shell surface and the top block surface. The void expands substantially across the shell length and the shell width.

The mounting block comprises a first lateral wing integrally coupled to the left shell portion and a second lateral wing integrally coupled to the right shell portion. The mounting block may comprise an aperture for receiving the fastener.

The apparatus may further comprise a seat post. The mounting block may be mounted on top of the seat post while the fastener couples the saddle shell and the mounting block to the seat post.

The mounting block may comprise a toothed bottom surface. The seat post may comprise a toothed upper surface configured to mate with the toothed bottom surface of the mounting block.

The saddle shell may comprises a first material while the mounting block comprises a second material. The first material may be more flexible than the second material.

The top block surface preferably makes no contact with the bottom shell surface.

In a further aspect, a rail-less bicycle saddle apparatus comprises a seat post, a saddle shell composed of a first material, and a mounting block composed of a second material, wherein the first material is more flexible than the second material. The saddle shell comprises a top shell surface, a bottom shell surface, a left shell portion, a right shell portion, a shell length and a shell width. The mounting block is coupled to the left shell portion and the right shell portion. The mounting block comprises a top block surface and an aperture. The mounting block is mounted on top of the seat post. A fastener is configured to couple the saddle shell and the mounting block to the seat post. The fastener extends through the aperture. A void is defined between the bottom shell surface and the top block surface. The void expands substantially across the shell length and the shell width, The mounting block comprises a first lateral wing integrally coupled to the left shell portion and a second lateral wing integrally coupled to the right shell portion.

The mounting block may comprise a toothed bottom surface. The seat post may comprise a toothed upper surface configured to mate with the toothed bottom surface of the mounting block.

The top block surface preferably makes no contact with the bottom shell surface.

In summary, A rail-less bicycle saddle apparatus includes a mounting block coupled to the bottom of a saddle shell to form a void between a top of the mounting block and the bottom of the shell. The mounting block has a pair of wings that extend laterally to attach to lateral undersides of the saddle shell. A fastener secures the mounting block to the top of a seat post.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS

Figure 1:
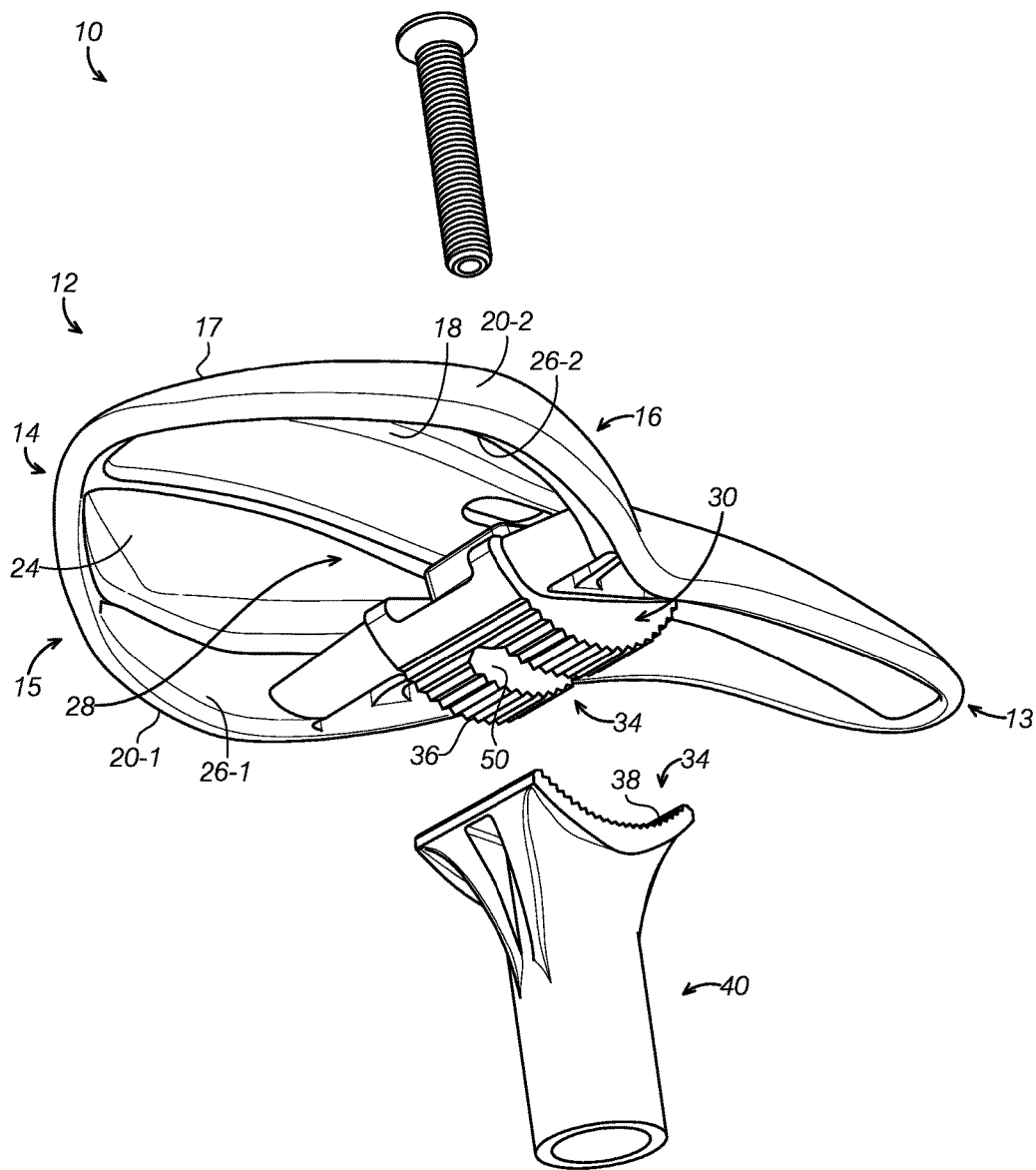
FIG. 1 is a bottom exploded view of a preferred embodiment of a bicycle saddle apparatus.

A first preferred embodiment of a bicycle saddle apparatus, or simply apparatus, is illustrated in FIG. 1 and designated generally by the reference numeral 10.

Figure 2:
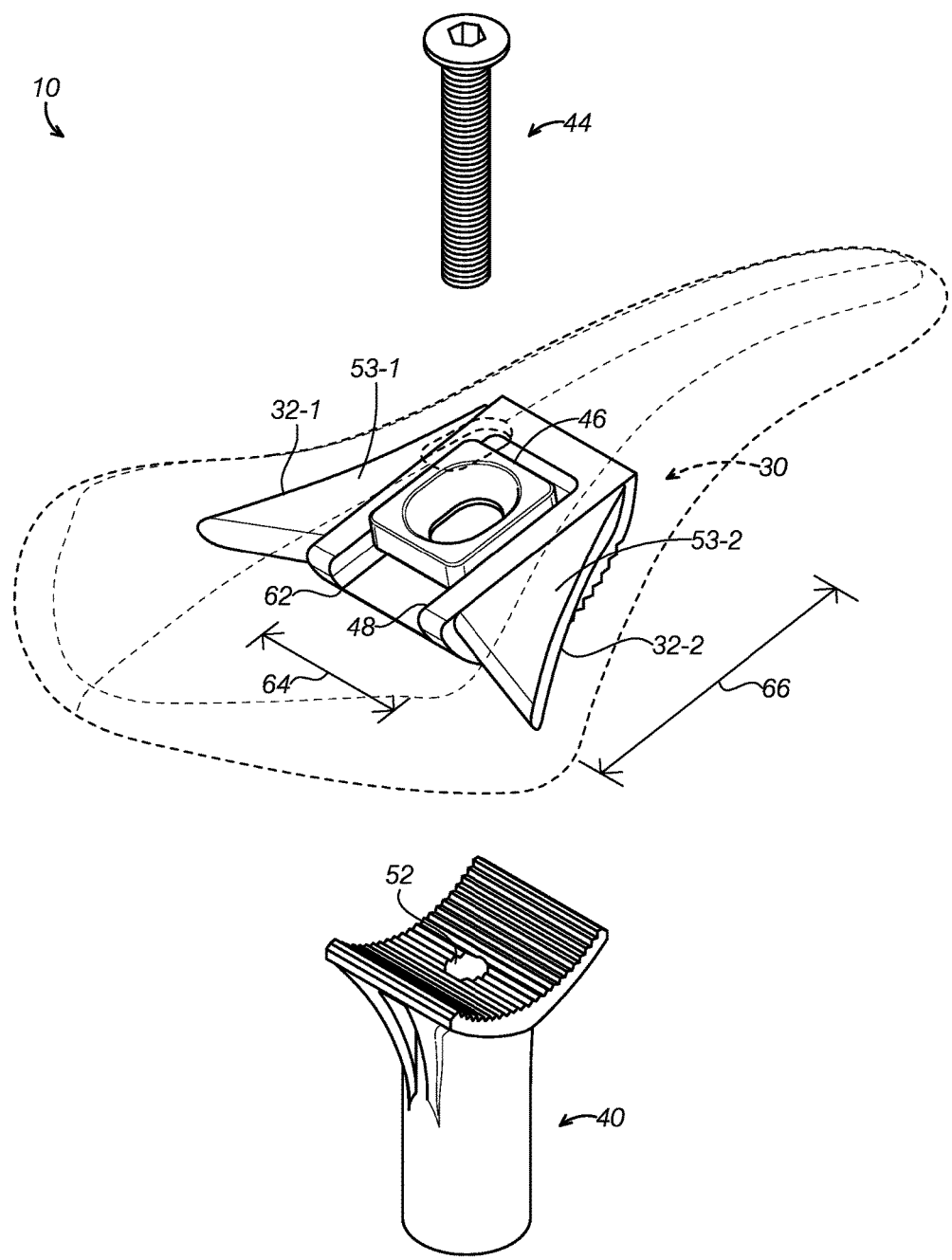
FIG. 2 is a top exploded view of the preferred embodiment of a bicycle saddle apparatus with the saddle shell illustrated in phantom lines.

In FIGS. 1 and 2, the apparatus 10 comprises a saddle base, or simply shell, 12. The shell 12 comprises a front end 13, a rear end 14, a left side 15, a right side 16, an outer surface 17 and an inner surface, or underside, 18. A first left sidewall 20-1 extends downwardly along the left side 15 while a second right sidewall 20-2 extends downwardly along the right side 16. The underside 18 thus comprises a substantially planar bottom surface 24 positioned beneath the portions of the shell 12 that would support a rider, as well as a pair of lateral undersurfaces 26-1, 26-2 formed on the left side 15 and right side 16, respectively.

Figure 3A:
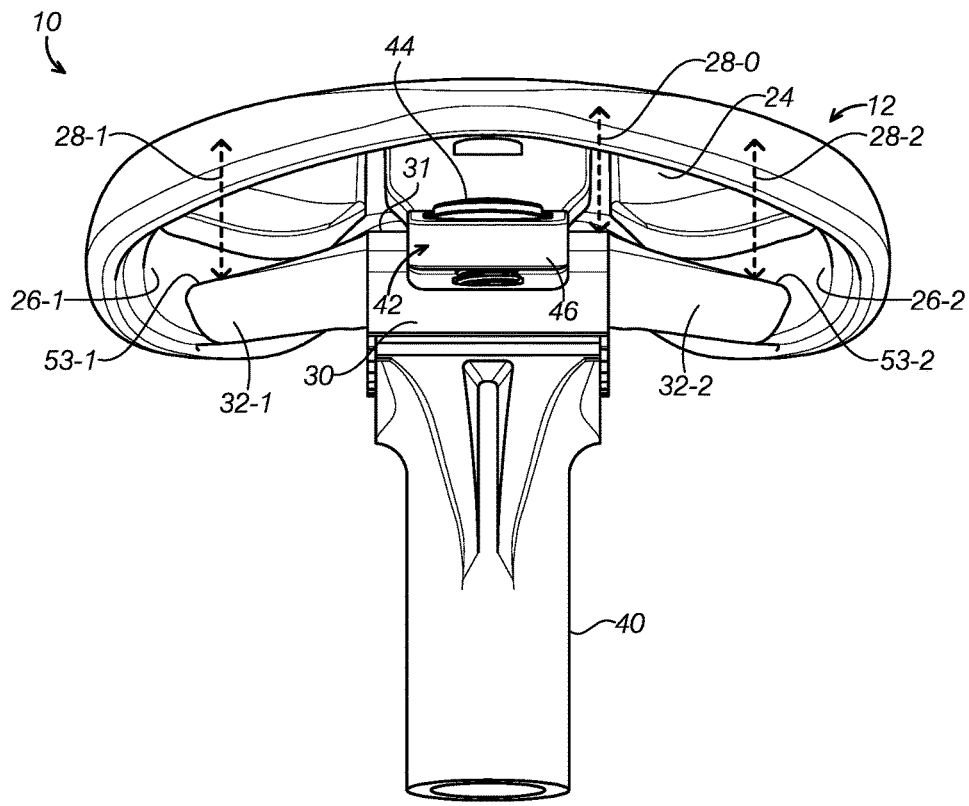
FIG. 3A is a rear elevation view of the preferred embodiment of the bicycle saddle apparatus.

In FIG. 3A, a mounting block 30 is configured to be coupled to the underside 18 of the shell 12 and to a top of a seat post 40. In the preferred embodiment, the preferred mounting block 30 is coupled to the lateral undersurfaces 26-1, 26-2 in such a manner so as to create a void, or gap, 28 between the mount 30 and the planar bottom surface 24. Thus, the mounting block 30 preferably does not support or otherwise contact the planar bottom surface 24. Instead, the mounting block 30 may comprise a pair of laterally extending wings 32-1, 32-2 coupled to, or formed integrally with, the lateral undersurfaces 26-1, 26-2, respectively. This void 28 provides a vertical space between the shell 12 and structures underneath, thereby enabling the shell 12 to flex downward when sat upon. This void 28 has a length and width that generally span the length and width of the planar bottom surface 24. As described in more detail below, the void 28 has differing depths depend upon which the particular section or area of the void 28 and the presence of any structures underneath. This provides the rider with cushioning support which would not be possible if the mounting block 30 were attached to the bottom planar surface 24.

The apparatus 10 is "rail-less" in that saddle rails, whether separate or integrated, are omitted. Therefore, no rails are employed to connect the shell 12 to the bicycle.

Figure 4:
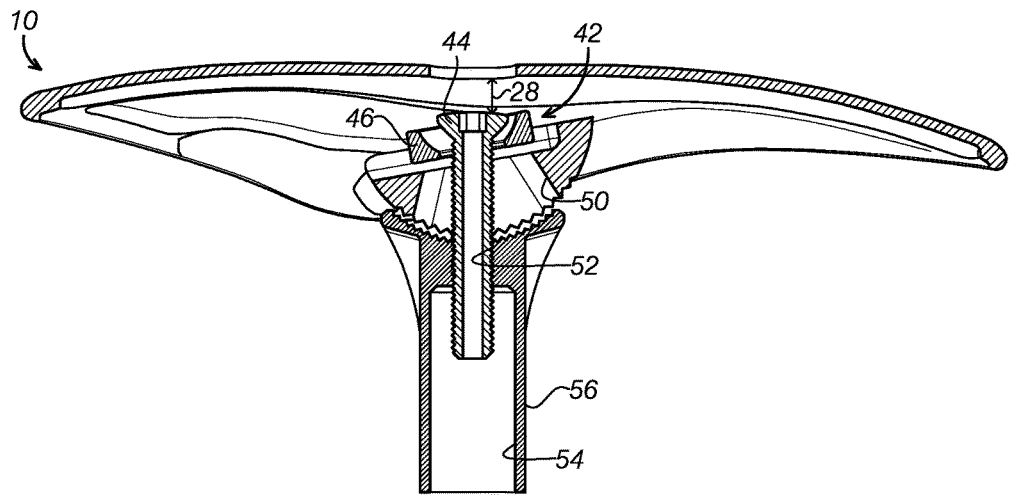
FIG. 4 is a cross-sectional view of the preferred embodiment of the bicycle saddle apparatus taken along a sagittal plane.
Figure 5:
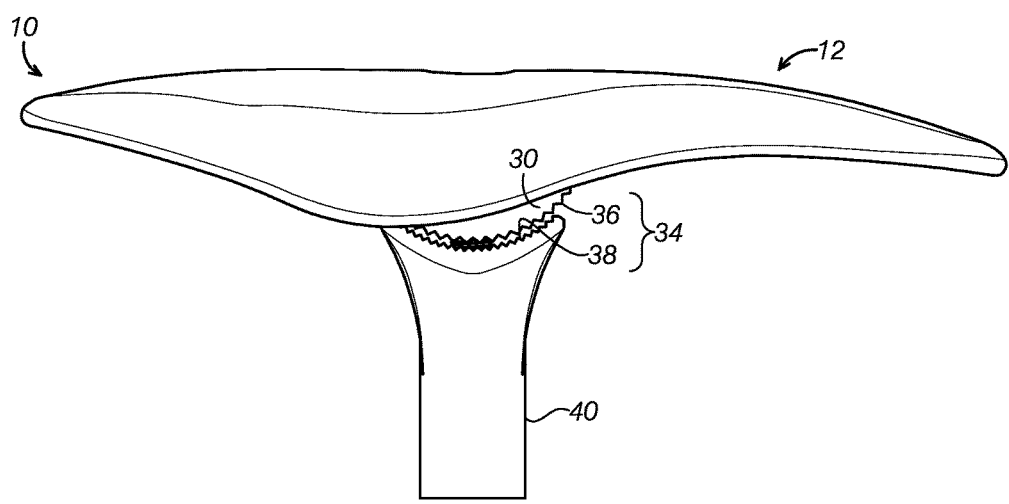
FIG. 5 is a right side elevation view of the preferred embodiment of the bicycle saddle apparatus.

In FIGS. 4 and 5, the apparatus 10 may comprise a saddle adjustment mechanism 34 to enable adjustment of the pitch, and other planes of motion, of the saddle shell 12 when disassembled or loosened from a seat post 40. The pitch adjustment mechanism 34 may comprise a toothed or geared bottom portion 36 formed on the mounting block 30 that is configured to mate with a toothed or geared top portion 38 of a seat post 40. In the illustrated embodiment, the bottom mounting block portion 36 is convex while the top seat post portion 40 is concave. It is to expressly understood that the concave-convex relationship between the bottom mounting block portion 36 and the top seat post portion 40 may be reversed. It will be appreciated that the saddle apparatus 10 omits conventional rails while still providing vertical spacing between the saddle shell 12 and the mounting block 30.

To assemble the saddle apparatus 10, a securing mechanism 42 may be employed to secure the mounting block 30 to the seat post 40. In the preferred embodiment, the securing mechanism 42 may comprise a fastener 44, such as threaded screw, and washer 46. In FIG. 5, the washer 46 is disposed in a top cavity, or recess, 48 preferably formed with a polygonal perimeter conforming to the polygonal perimeter of the of the mounting block 30, which is shown in the illustrated embodiment as a rectangle. The fastener 44 is inserted through the washer 46 and an aperture, which may be shaped as a longitudinal slot, 50 defined in the mounting block 30. The fastener 44 may comprise an externally threaded screw that can be screwed into an internally threaded bore 52 defined in the seat post 40 and configured to mate with the screw 44. The bore 52 is positioned above a hollow cavity 54 that may extend downwardly through the remainder of the tube 56 of the seat post 40. An opening 58 formed in the saddle shell 12 is positioned above and aligned with the location of the assembled fastener 44 to provide access thereto.

When assembled, it will be appreciated that the fastener 44 is not inserted through the shell 12, but instead rests beneath the shell 12 so as to maintain the void 28 between the planar bottom surface 24 and the top of the mounting block 30. Thus, the fastener 44 and washer 46 preferably do not contact the underside 18 of the saddle shell 12 once assembled, but rather still leave a vertical space from the planar bottom surface 24. Extending downwardly through the aperture 50 of the mounting block 30, the fastener 44 is screwed into the seat post 40 so as to couple the mounting block 30 and the integral shell 12 to the seat post 40.

Referring back to FIG. 2, the mounting block 30 preferably comprises a central body 62 having a body width 64 and a body length 66 that may conform to the post width and post length of the top seat post portion 38. Each wing 32-1, 32-2 extends laterally a sufficient distance from the central body 62 to abut and attach to a corresponding sidewall 20-1, 20-2, respectively.

Each wing 32-1, 32-2 comprises a substantially planar top surface 53-1, 53-2 vertically spaced apart the planar bottom surface 24. Each wing top surface 53-1, 53-2 preferably makes no contact with the planar bottom surface 24. Each wing 32-1, 32-2 preferably attaches to a mid-section 58 of the saddle shell 12 where the saddle shell 12 transitions from a wider rear portion 60 to a narrower nose portion 62. Other than the mounting block 30 and the seat post 40, the apparatus 10 may preferably omit further structures such that there are no structures directly underneath wider rear portion 60 and narrower nose portion 62. This results in a simpler and lighter overall saddle apparatus 10 due to lesser material.

Figure 6:
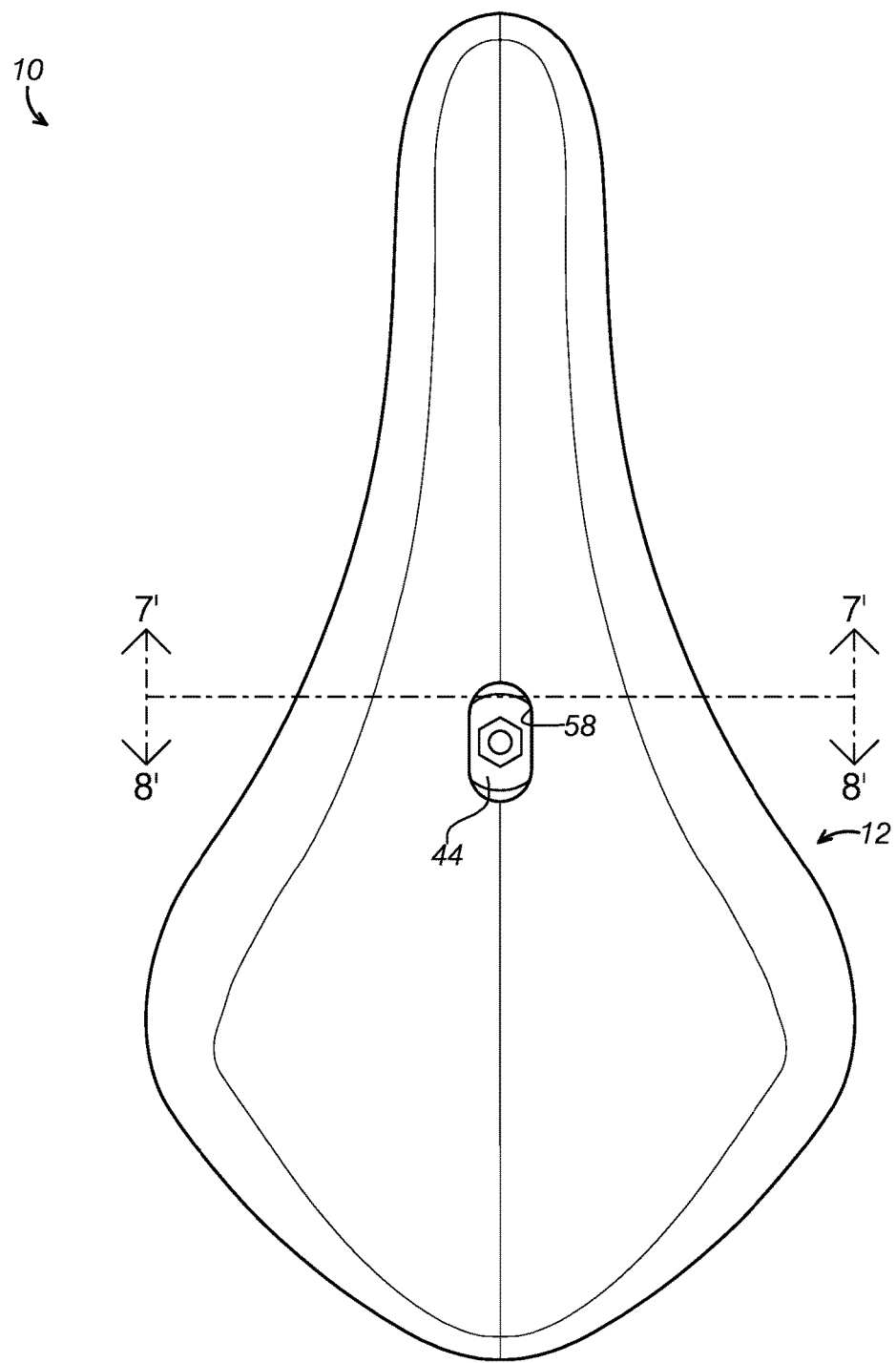
FIG. 6 is a top plan view of the preferred embodiment of the bicycle saddle apparatus.

As shown in FIGS. 1, 2 and 6, the wings 32-1, 32-2 extend generally along a horizontal plane that is substantially perpendicular to the vertical axis of the seat post 40 and substantially parallel to a plane defined by the top surface 17 of the saddle shell 12. In particular, the wings 32-1, 32-2 preferably do not extend vertically towards the planar bottom surface 24.

Figure 3B:
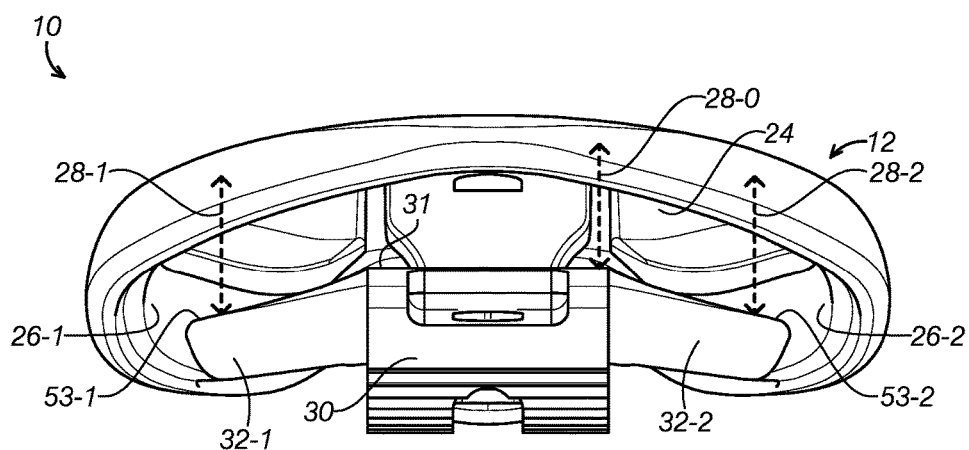
FIG. 3B is a rear elevation view of the preferred embodiment of the bicycle saddle apparatus where the seat post and securing mechanism have been removed for clarity.

In FIG. 3B, the seat post and securing mechanism have been removed for clarity to better illustrate the void sections 28-0, 28-1, 28-2. In FIGS. 3A and 3B, the void 28 has a central section 28-0 with a first depth, and a pair of lateral sections 28-1, 28-2 defining a second depth that may be the same as or different than the first depth. The first depth of the central void section 28-0 extends from the planar bottom surface 24 to the top surface of a central portion 31 of the mounting block 30, preferably in the range of 5 mm to 30 mm.

The left void section 28-1 and right void section 28-2 each have a second depth extending from the planar bottom surface 24 to the respective wing top surfaces 53-1, 53-2, preferably in the range of 2 mm to 30 mm.

Each wing 32-1, 32-2 preferably comprises a wing length 68 that approximates the body 66. Each wing 32-1, 32-2 also comprises a wing width 72 that tapers as each wing 32-1, 32-2 extends forward, conforming to the perimeter of the shell 12 that narrows or converges towards the nose portion.

Figure 7:
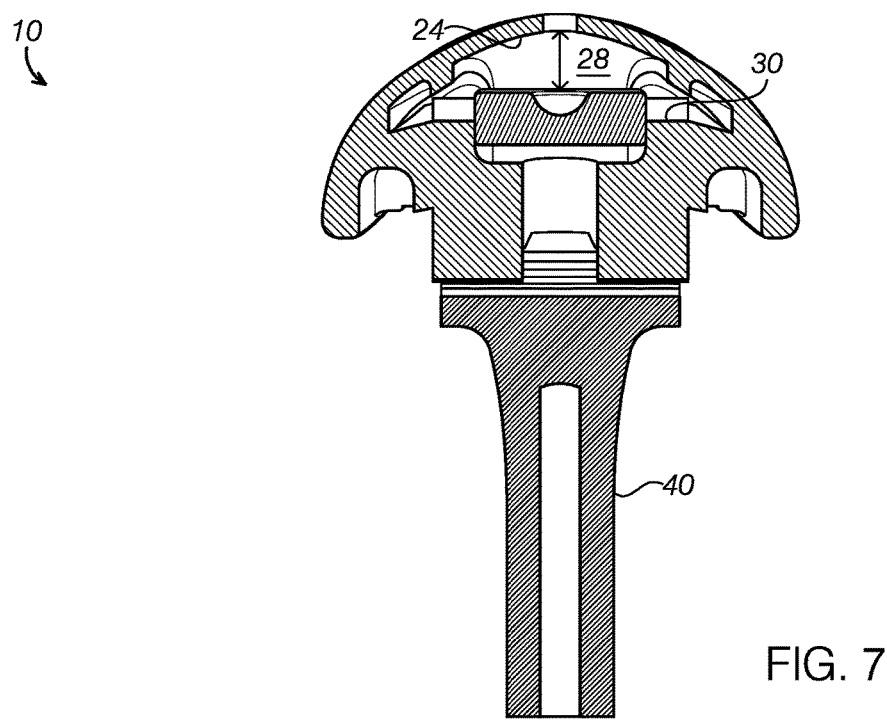
FIG. 7 is a cross-sectional view of the first preferred embodiment of the bicycle saddle apparatus taken along lines 7'-7' of FIG. 6.
Figure 8:
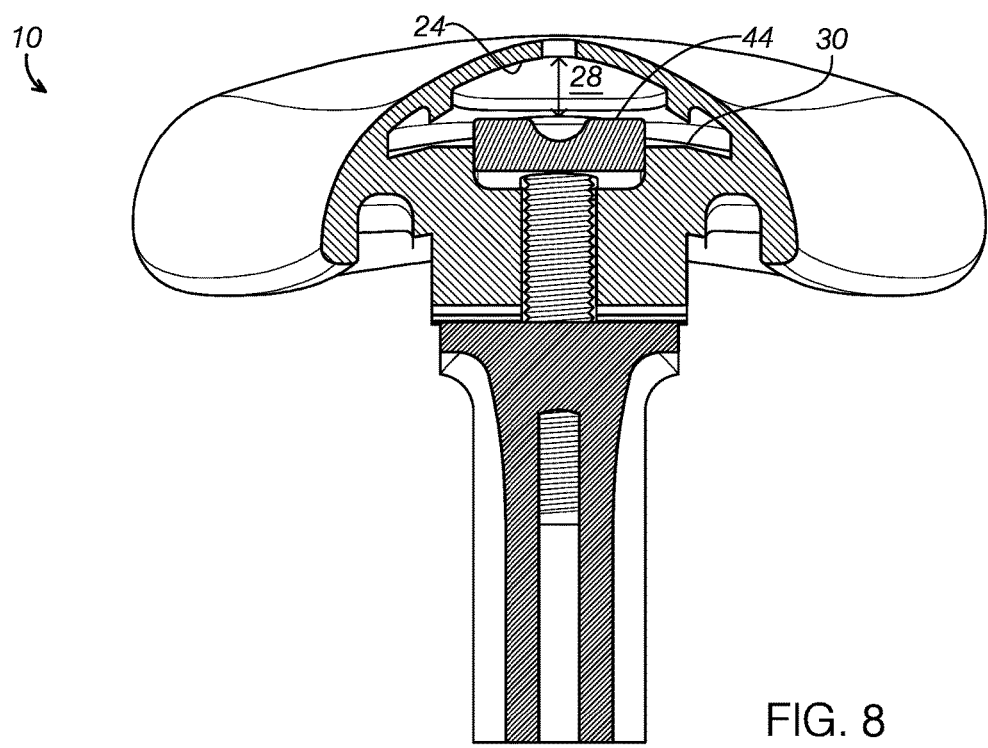
FIG. 8 is a cross-sectional view of the first preferred embodiment of the bicycle saddle apparatus taken along lines 8'-8' of FIG. 6.

In FIGS. 7 and 8, it will be appreciated that the vertical void 28 is maintained between the planar bottom surface 24 and the tops of the mounting block 30 and fastener 44. In the preferred embodiment, the mounting block 30, including the wings 32-1, 32-2, may be formed integrally with the saddle shell 12. This monolithic combination of the saddle shell 12 and mounting block 30 may then be simply mounted as a unitary structure on top of the seat post 40. FIGS. 7 and 8 also illustrate how the saddle shell 12 is provided with space underneath for flexing under the weight of a seated rider without employing any saddle rails. It will be further appreciated that the planar bottom surface 24 of the shell 12 and the integral mounting block 30 collectively form a closed loop defining the void 28.

Figure 9:
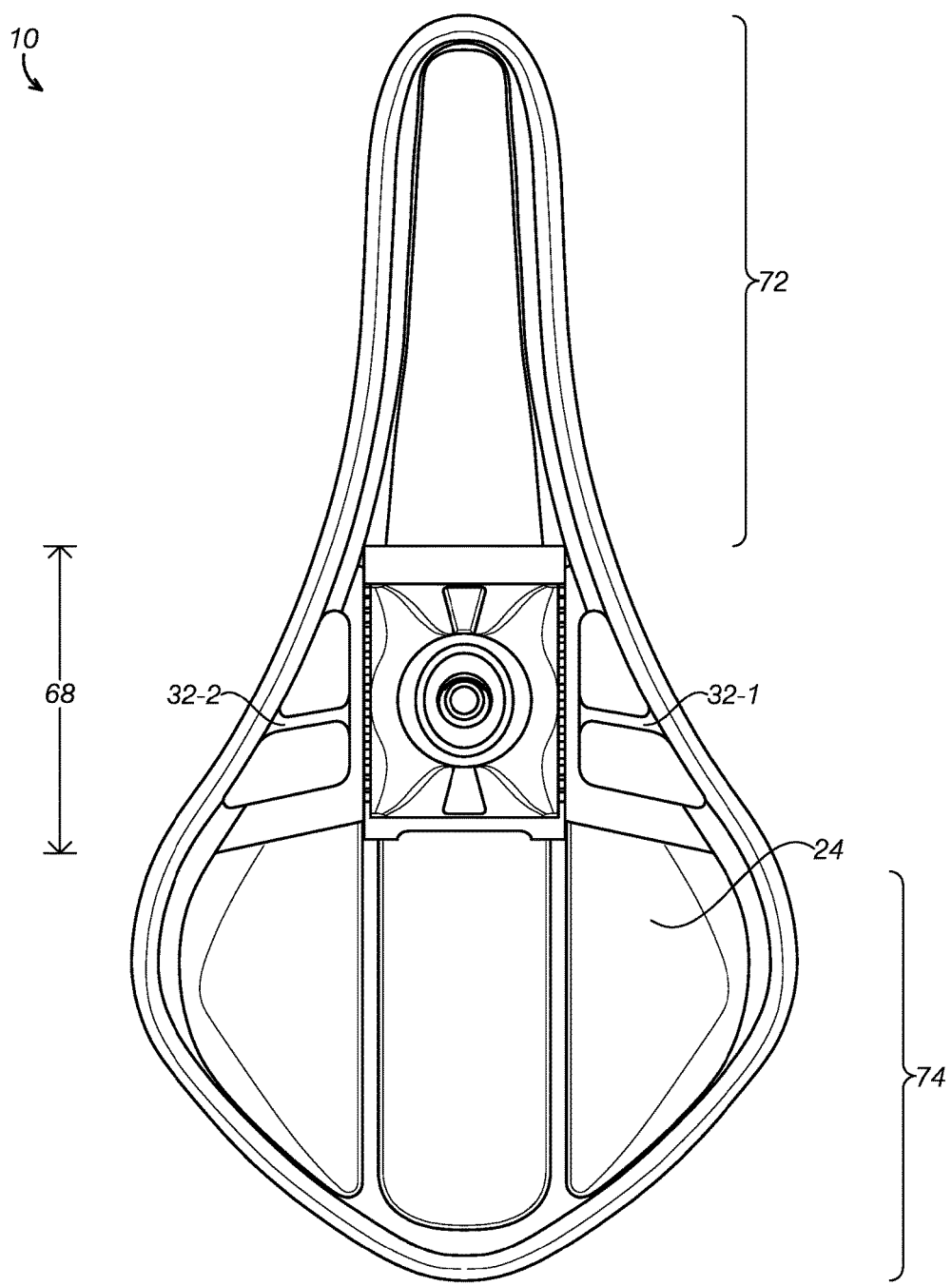
FIG. 9 is a bottom plan view of the preferred embodiment of the bicycle saddle apparatus.

In the bottom plan view of FIG. 9, it will be appreciated that the preferred apparatus 10 is devoid of structures underneath both the nose saddle region 72 in front of the mounting block 30 and the rear saddle region 74 behind the mounting block 30.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A rail-less bicycle saddle apparatus, comprising:
   a saddle shell comprising a top shell surface, a bottom shell surface, a left shell portion and a right shell portion, the left shell portion and the right shell portion extending at an angle from the bottom shell surface; and
   a mounting block integrally formed with the saddle shell, the mounting block comprising a top block surface, a first lateral wing coupled to the left shell portion and a second lateral wing coupled to the right shell portion, the first lateral wing and the second lateral wing extending from the mounting block at opposing sides thereof in opposing directions,
   wherein a void is defined between the bottom shell surface and the top block surface, and
   wherein the void is configured to prevent contact between the top block surface of the mounting block and the bottom shell surface.

2. The apparatus of claim 1, further comprising a fastener coupled to the mounting block.

3. The apparatus of claim 2, further comprising a seat post, wherein:
   the mounting block is mounted on top of the seat post; and
   the fastener couples the saddle shell and the mounting block to the seat post.

4. The apparatus of claim 3, wherein:
   the mounting block comprises an aperture for receiving the fastener; and
   the fastener extends vertically downward through the aperture.

5. The apparatus of claim 3, wherein:
   the mounting block comprises a toothed bottom surface; and
   the seat post comprises a toothed upper surface configured to mate with the toothed bottom surface of the mounting block.

6. The apparatus of claim 1, wherein:
   the saddle shell comprises a first material;
   the mounting block comprises a second material; and
   the first material is more flexible than the second material.

7. The apparatus of claim 1, wherein the top block surface makes no contact with the bottom shell surface.

8. The apparatus of claim 1, wherein void expands substantially across a length of the saddle shell and a width of the saddle shell.

9. A rail-less bicycle saddle apparatus, comprising:
   a saddle shell comprising a top shell surface, a bottom shell surface, a left shell portion, a right shell portion, a shell length and a shell width;
   a mounting block coupled to the left shell portion and the right shell portion, the mounting block comprising a top block surface, a first lateral wing coupled to the left shell portion and a second lateral wing coupled to the right shell portion, the first lateral wing and the second lateral wing extending from the mounting block at opposing sides thereof in opposing directions; and a fastener coupled to the mounting block, wherein a void is defined between the bottom shell surface and the top block surface, the void expanding substantially across the shell length and the shell width.

10. The apparatus of claim 9, wherein the mounting block comprises an aperture for receiving the fastener.

11. The apparatus of claim 9, further comprising a seat post, wherein:

the mounting block is mounted on top of the seat post; and the fastener couples the saddle shell and the mounting block to the seat post.

12. The apparatus of claim 11, wherein:

the mounting block comprises a toothed bottom surface; and the seat post comprises a toothed upper surface configured to mate with the toothed bottom surface of the mounting block.

13. The apparatus of claim 9, wherein:

the saddle shell comprises a first material;

the mounting block comprises a second material; and the first material is more flexible than the second material.

14. The apparatus of claim 9, wherein the top block surface makes no contact with the bottom shell surface.

15. A rail-less bicycle saddle apparatus, comprising:

a saddle shell comprising a first material, a top shell surface, a bottom shell surface, a left shell portion, a right shell portion, a shell length and a shell width;

a seat post;

a mounting block coupled to the left shell portion and the right shell portion, the mounting block comprising a second material, a top block surface and an aperture, the mounting block being mounted on top of the seat post, the mounting block comprising a first lateral wing coupled to the left shell portion and a second lateral wing coupled to the right shell portion, the first lateral wing and the second lateral wing extending from the mounting block at opposing sides thereof in opposing directions;

a fastener configured to couple the saddle shell and the mounting block to the seat post, the fastener extending through the aperture, wherein a void is defined between the bottom shell surface and the top block surface, the void expanding substantially across the shell length and the shell width, wherein the first material is more flexible than the second material.

16. The apparatus of claim 15, wherein the mounting block comprises a first lateral wing integrally coupled to the left shell portion and a second lateral wing integrally coupled to the right shell portion.

17. The apparatus of claim 15, wherein:

the mounting block comprises a toothed bottom surface; and the seat post comprises a toothed upper surface configured to mate with the toothed bottom surface of the mounting block.

18. The apparatus of claim 15, wherein the top block surface makes no contact with the bottom shell surface.

* * * * *